United States Patent [19]

Steinstrasser

[11] 4,011,173

[45] Mar. 8, 1977

[54] MODIFIED NEMATIC MIXTURES WITH POSITIVE DIELECTRIC ANISOTROPY

[75] Inventor: Ralf Steinstrasser, Darmstadt, Germany

[73] Assignee: Merck Patent Gesellschaft mit beschrankter Haftung, Darmstadt, Germany

[22] Filed: Apr. 17, 1974

[21] Appl. No.: 461,653

Related U.S. Application Data

[63] Continuation-in-part of Ser. No. 277,502, Aug. 3, 1972.

[30] Foreign Application Priority Data

Apr. 28, 1973    Germany .......................... 2321632

[52] U.S. Cl. ......................... 252/299; 350/160 LC
[51] Int. Cl.² ......................... C09K 3/34; G02F 1/13
[58] Field of Search ................ 252/408 LC, 299; 350/160 LC

[56] References Cited

UNITED STATES PATENTS

| | | | |
|---|---|---|---|
| 3,773,747 | 11/1973 | Steinstrasser | 250/160 LC |
| 3,781,088 | 12/1973 | Tsukamoto et al. | 252/408 LC |
| 3,795,436 | 3/1974 | Boller et al. | 252/408 LC |
| 3,796,479 | 3/1974 | Helfrich et al. | 252/408 LC |
| 3,815,972 | 6/1974 | Hsieh | 252/408 LC |
| 3,836,478 | 9/1974 | Green et al. | 252/408 LC |
| 3,876,286 | 4/1975 | Deutscher et al. | 252/299 |
| 3,881,806 | 5/1975 | Suzuki | 252/299 |
| 3,891,307 | 6/1975 | Tsukamoto et al. | 350/160 LC |
| 3,915,883 | 10/1975 | Van Meter et al. | 252/299 |
| 3,919,105 | 11/1975 | Katagiri et al. | 252/299 |
| 3,923,857 | 12/1975 | Boller et al. | 252/299 |
| 3,947,375 | 3/1976 | Gray et al. | 252/299 |
| 3,960,752 | 6/1976 | Klanderman et al. | 252/299 |

FOREIGN PATENTS OR APPLICATIONS

| | | | |
|---|---|---|---|
| 2,359,777 | 6/1974 | Germany | 252/299 |
| 2,502,904 | 7/1975 | Germany | 252/299 |
| 2,123,175 | 12/1971 | Germany | 252/299 |
| 2,024,269 | 12/1971 | Germany | 252/299 |
| 2,327,036 | 12/1973 | Germany | 252/299 |
| 2,139,628 | 2/1973 | Germany | 252/299 |
| 4,934,488 | 3/1974 | Japan | 252/299 |
| 4,988,791 | 8/1974 | Japan | 252/299 |
| 4,938,888 | 4/1974 | Japan | 252/299 |
| 4,978,683 | 7/1974 | Japan | 252/299 |

*Primary Examiner*—Benjamin R. Padgett
*Assistant Examiner*—T. S. Gron
*Attorney, Agent, or Firm*—Millen & White

[57] ABSTRACT

Nematic mixtures on the basis of derivatives of azoxybenzene and/or the phenyl ester of benzoic acid, containing at least one compound of the general formula $$X - R - Y$$

wherein X represents straight-chain alkyl of 4–9 carbon atoms or dialkylamino of 2–4 carbon atoms, Y represents cyano, nitro, or trifluoromethyl, and R represents a divalent group of the Formula 2a, 2b, 2c, or 2d:

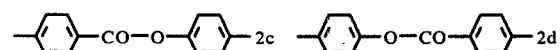

and optionally additionally one or more compounds of Formula 3

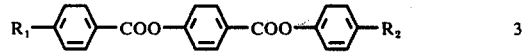

wherein $R_1$ and $R_2$ represent alkyl or alkoxy of 1–8 carbon atoms, possess a positive dielectric anisotropy and are advantageously utilized as dielectrics in liquid/-crystal cells with homogeneous orientation.

33 Claims, No Drawings

MODIFIED NEMATIC MIXTURES WITH POSITIVE DIELECTRIC ANISOTROPY

CROSS-REFERENCE TO RELATED APPLICATION

This application is a continuation-in-part of copending, commonly assigned U.S. patent application Ser. No. 277,502 filed Aug. 3, 1972, the contents of which are incorporated by reference herein.

BACKGROUND OF THE INVENTION

This invention relates to modified nematic mixtures having positive dielectric anisotropy.

Nematic liquid-crystal substances are utilized as dielectrics in electrooptic devices in order to convert electric voltage pulses into optically perceptible information. A preferred type of electrooptic device utilizing liquid-crystal substances is the liquid-crystal cells with homogeneous, i.e. parallel or perpendicular orientation, for example a twisted nematic cell arranged between parallel or crossed polarizers such as described in Applied Physics Letters 18: 127–128 (1971), as well as in German Unexamined Laid-Open Application DOS 2,202,555. For such devices, nematic substances are required having positive dielectric anisotropy, i.e. a dielectric constant which is larger when parallel to the longitudinal direction of the molecule swarms than when at right angles to this direction. Those nematic substances are preferred wherein this difference of the two dielectric constants (hereinafter called $\Delta\epsilon$) has a value of at least +2, preferably of at least +3.

Nematic substances having a positive dielectric anisotropy are known. For example, a nematic mixture having this property is described in DOS 2,202,555, consisting of 3–40 parts by weight of a 4-cyanobenzal-4'-alkyl aniline and 97–60 parts by weight of a mixture of (a) 20–80 parts by weight of bis(4'-n-octyloxybenzal)2-chlorophenylenediamine and (b) 20–80 parts by weight of p-methylbenzal-p'-n-butylaniline. According to Applied Physics Letters 18: 127–128 (1971), N-(4'-alkoxybenzylidene)-4-aminobenzonitriles are also utilized as nematic substances having positive dielectric anisotropy.

Although several of these known nematic substances with positive dielectric anisotropy form nematic mesophases over wide and favorably located temperature ranges, i.e. at or below room temperature, they nonetheless have a very limited practical applicability. The azomethines are so sensitive to moisture that partial hydrolysis begins when they are exposed to normal atmospheric humidity. The hydrolysis products reduce the electric resistance of the dielectric and thereby considerably impair the function of the manufactured electrooptic devices.

Other known nematic substances with positive dielectric anisotropy are 4-alkyl-benzoic acid 4'-cyanophenyl esters described in DOS 2,234,522. Although these compounds possess satisfactory chemical stability, they exhibit a narrow nematic mesophase temperature range which is generally so high that electrooptic devices employing these substances must be heated and controlled by a thermostat in the operating condition.

Nematic compositions of azoxybenzenes and phenyl benzoates are known which exhibit excellent chemical resistance and also form nematic mesophases over wide and favorably located temperature ranges, e.g. see DOS 2,014,989 and DOS 2,139,628, respectively.

However, these substances either have a negative or weakly positive ($\Delta\epsilon>2$) dielectric anisotropy and thus cannot be utilized as dielectrics in liquid-crystal cells with homogeneous orientation, i.e. liquid-crystal cells wherein the longitudinal axes of the molecules of the dielectric are orientated parallel to the surface of the electrodes.

OBJECTS OF THE INVENTION

Accordingly, it is a general object of the present invention to provide nematic compositions which are not subject to the abovementioned deficiencies of prior art nematic compositions.

Another object of this invention is to provide a method for raising the dielectric anisotropy of nematic compositions to more positive values.

A further object of this invention is to provide nematic compositions having enhanced positive dielectric anisotropy.

An additional object of the present invention is to provide nematic compositions having a favorable combination of sufficiently positive dielectric anisotropy, mesophases located over a wide and favorable temperature range at or below room temperature, and excellent chemical stability.

A more particular object of the present invention is to provide improved liquid-crystal cells of homogeneous orientation wherein the nematic composition exhibits the above properties.

Upon further study of the specification and appended claims, further objects and advantages of this invention will become apparent to those skilled in the art.

SUMMARY OF THE INVENTION

Briefly, the above and other objects are attained in one aspect of the present invention by providing a modified nematic mixture having positive dielectric anisotropy, comprising an admixture of:

(a) at least one nematic compound of the formula

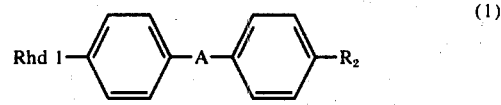

(1)

wherein A is azoxy or carbonyloxy and $R_1$ and $R_2$ are each straightchain alkyl or alkoxy of 1–8 carbon atoms; and (b) at least one compound of the formula

X — R — Y     2 wherein X is straight-chain alkyl of 4–9 carbon atoms or dialkylamino of 2–4 carbon atoms; Y is cyano, nitro or trifluoromethyl; and R is selected from the group consisting of divalent radicals of the formulae

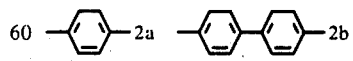

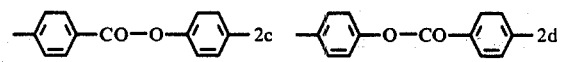

characterized in that component (b) is present in an amount sufficient to increase the dielectric anisotropy of the composition to a value of at least +2.

DETAILED DISCUSSION

It has now been found that nematic compositions of azoxybenzenes and/or phenyl benzoates (benzoic acid phenyl esters) of Formula 1 can be modified so that they exhibit a marked positive dielectric anisotropy, yet retain their chemical stability, with an only insubstantial effect on the location and width of the temperature range of the nematic mesophase, and that the modified compositions can be utilized as dielectrics in liquid-crystal cells with homogeneous orientation.

According to the present invention, this dielectric anisotropy modification of nematic substances comprising compounds of Formula I is obtained by adding to these substances a dielectric anisotropy-increasing amount of at least one compound of Formula 2 wherein X represents straight-chain alkyl of 4–9 carbon atoms or dialkylamino of 2–4 carbon atoms, Y represents cyano, nitro or trifluoromethyl, and R is a divalent group of the Formula 2a, 2b, 2c, or 2d.

It has, furthermore, been found that the undesired changes which may occur in the properties of the nematic substances of Formula 1 by the addition of a compound of Formula 2, especially with regard to the position and/or width of the temperature range of the nematic mesophase can be compensated for by adding to the mixtures of the compounds of Formula 1 and 2 additionally at least one compound of Formula 3

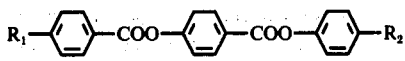

wherein $R_1$ and $R_2$ can be alike or different and each have the above-indicated values.

The nematic compositions based on compounds of Formula 1 which are to be modified in accordance with this invention are conventional. Preferred compounds and mixtures of compounds of Formula 1 wherein A represents an azoxy group are described, for example, in U.S. Pat. No. 3,773,747, in DOS 2,201,122 and in DOS 2,214,327.

Preferred compounds of Formula 1 wherein A is a carbonyloxy group are described, for example in DOS No. 2,139,628, corresponding to U.S. patent application Ser. No. 277,502 filed Aug. 3, 1972. Nematic substances with positive dielectric anisotropy, which can especially advantageously be employed as dielectrics in twisted nematic cells, are obtained according to this invention by modifying those compounds or mixtures of compounds of Formula 1 wherein at least one of the groups $R_1$ and $R_2$ is a straight-chain alkyl group.

The compounds of Formula 2 which have now been found to increase the dielectric anisotropy of compounds of Formula 1 when admixed therewith to form a broad (e.g. over a temperature range of about 20° to 80° Centigrade and favorably located (e.g. the range extends over temperatures from 0° C to 30° C.) nematic mesophase are normally themselves not liquid crystals, only monotropic liquid crystals, or form an enantiotropic nematic mesophase at best over a very narrow temperature range, e.g. of 3° to 12°. It is, therefore, quite surprising that the addition of even small amounts of these compounds to compounds of Formula 1, which latter inherently have a negative or a too low positive ($\Delta\epsilon<2$) dielectric anisotropy, gives a liquid crystal composition exhibiting favorable dielectric anisotropy, enantiotropic nematic mesophase and chemical stability properties.

The compounds of Formula 2 are known in the art or can be prepared to analogous compounds which are known in the art. Preferred compounds or mixtures of compounds of Formula 2 are those meeting one or more of the following criteria:

(a) Compounds of Formula 2 wherein X is dialkylamino, especially when dimethylamino and R has the structure of Formula 2a or 2b;
(b) Compounds of Formula 2 wherein X is n-alkyl of 4–8 carbon atoms and R has the structure of Formula 2c or 2d;
(c) Compounds of (a) and (b) wherein Y is cyano;
(d) Compounds of Formula 2 wherein X is n-alkyl having a chain length not differing by more than 2 carbon atoms from that of at least one of $R_1$ and $R_2$ in the compound of Formula 1 employed in the admixture.

The preferred compound of Formula 2 for a given admixture will depend to some extent on the particular compound of Formula 1 employed and the properties sought in the resultant admixture. Best results are normally obtained when one or more compound(s) of Formula 2 are added which are soluble in the component(s) of Formula 1 to a sufficient extent to modify the dielectric anisotropy to the desired positive value.

In another aspect of this invention, it has been found that compounds of Formula 3 can be added to the admixtures of Formulae 1 and 2 to favorably modify the position and/or width of the nematic mesophase in the admixture. These compounds and their preparations are more particularly described in the referenced U.S. patent application Ser. No. 277,502 and corresponding DOS No. 2,139,628. By the addition of a compound of Formula 3 to an admixture of Formulae 1 and 2, the clearing point of the admixture is increased, thereby advantageously expanding the temperature range of the nematic mesophase.

Preferred compounds of Formula 3 are those wherein at least one of $R_1$ and $R_2$ is straight-chain alkyl, preferably straight chain alkyl of 4–8 carbon atoms, and especially n-butyl. Best results are normally obtained by selecting a compound of Formula 3 which exhibits a sufficiently high solubity in the given admixture of the compounds of Formula 1 and 2.

Normally, the modified nematic mixtures according to this invention contain 65–99%, preferably 70–95% by weight of at least one nematic compound of Formula 1 and 35–1%, preferably 30–5% by weight of at least one compound of Formula 2. Admixtures of this invention which contain additionally a compound of Formula 3 normally contain 20–95%, preferably 45–80% by weight of at least one compound of Formula 1; 3–65%, preferably 10–45% by weight of a compound of Formula 2; and 2–27%, preferably 10–25% by weight of at least one compound of Formula 3.

According to the present invention, nematic substances on the basis of compound of Formula 1 are modified to obtain nematic substances having a clearly positive dielectric anisotropy (i.e. $\Delta\epsilon>2$), by admixing at least one compound of Formula 1 with at least one compound of Formula 2 and optionally one or more compounds of Formula 3. The modified nematic mixtures, consisting of compounds of Formulae 1 and 2 and optionally 3, are useful as dielectrics in liquid-crystal cells with homogeneous orientation. For example, a liquid-crystal cell with homogeneous orientation is prepared by filling a nematic mixture of compounds of Formulae 1, 2 and optionally 3 into a cell containing transparent or translucent electrodes at a spacing of 8–25 microns. Novel liquid-crystal cells with homogeneous orientation containing a liquid-crystal layer having a thickness of 8–25, preferably 10–20 microns, consisting essentially of a nematic mixture of compounds of Formulae 1, 2 and optionally 3 are thus provided.

It is surprising that the nematic substances of Formula 1, which inherently have a negative or only very slightly positive ($\Delta\epsilon<2$, generally $<0$) dielectric anisotropy, are converted into nematic substances with a clearly positive dielectric anisotropy $\Delta\epsilon>2$, preferably $>3$, generally 4–15) and a broad, favorably located nematic mesophase by adding small amounts of compounds of Formula 2 because the latter compounds themselves form an enantiotropic nematic mesophase at best in a very narrow temperature range and in most cases are not liquid-crystalline, or form only monotropic liquid crystals.

Suitable nematic compounds of Formula 1 or mixtures thereof modified in accordance with this invention include but are not limited to the following presently preferred embodiments.

4-methyl-4'-ethoxy-azoxybenzene
4-methyl-4'-n-butoxy-azoxybenzene
4-methyl-4'-n-hexoxy-azoxybenzene
4-ethyl-4'-methoxy-azoxybenzene
4-ethyl-4'-ethoxy-azoxybenzene
4-ethyl-4'-n-butoxy-azoxybenzene
4-ethyl-4'-n-hexoxy-azoxybenzene
4-ethyl-4'-n-octoxy-azoxybenzene
4-n-propyl-4'-methoxy-azoxybenzene
4-n-propyl-4'-ethoxy-azoxybenzene
4-n-propyl-4'-n-butoxy-azoxybenzene
4-n-butyl-4'-methoxy-azoxybenzene
4-n-butyl-4'-ethoxy-azoxybenzene
4-n-butyl-4'-n-propoxy-azoxybenzene
4-n-butyl-4'-n-butoxy-azoxybenzene
4-n-butyl-4'-n-pentoxy-azoxybenzene
4-n-butyl-4'-n-hexoxy-azoxybenzene
4-n-butyl-4'-n-heptoxy-azoxybenzene
4-n-butyl-4'-n-octoxy-azoxybenzene
4-n-pentyl-4'-methoxy-azoxybenzene
4-n-pentyl-4'-n-butoxy-azoxybenzene
4-n-hexyl-4'-methoxy-azoxybenzene
4-n-hexyl-4'-ethoxy-azoxybenzene
4-n-hexyl-4'-n-butoxy-azoxybenzene
4-n-hexyl-4'-n-hexoxy-azoxybenzene
4-n-hexyl-4'-n-octoxy-azoxybenzene
4-n-heptyl-4'-methoxy-azoxybenzene
4-n-heptyl-4'-n-butoxy-azoxybenzene
4-n-octyl-4'-methoxy-azoxybenzene
4-n-octyl-4'-ethoxy-azoxybenzene
4-n-octyl-4'-n-hexoxy-azoxybenzene.

In the above-mentioned azoxybenzene derivatives, the designation azoxy includes in each case the structural elements —N(O)=N— and —N=N(O)—; thus, for example, the designation 4-n-butyl-4'-methoxy-azoxybenzene encompasses in the scope of the present invention also the isomeric compound, 4-methoxy-4'-n-butyl-azoxybenzene, as well as mixtures of these isomers.

Furthermore, the following compounds or the mixtures thereof are preferably modified in accordance with this invention:

4,4'-di-n-propyl-azoxybenzene
4,4'-di-n-butyl-azoxybenzene
4,4'-di-n-pentyl-azoxybenzene
4,4'-di-n-hexyl-azoxybenzene
4,4'-di-n-heptyl-azoxybenzene
4,4'-di-n-octyl-azoxybenzene
4'-butylphenyl ester of 4-ethylbenzoic acid
4'-hexylphenyl ester of 4-ethylbenzoic acid
4'-ethoxyphenyl ester of 4-ethylbenzoic acid
4'-butoxyphenyl ester of 4-ethylbenzoic acid
4'-octoxyphenyl ester of 4-ethylbenzoic acid
4'-butylphenyl ester of 4-propylbenzoic acid
4'-pentoxyphenyl ester of 4-propylbenzoic acid
4'-ethylphenyl ester of 4-butylbenzoic acid
4'-butylphenyl ester of 4-butylbenzoic acid
4'-pentylphenyl ester of 4-butylbenzoic acid
4'-hexylphenyl ester of 4-butylbenzoic acid
4'-heptylphenyl ester of 4-butylbenzoic acid
4'-methoxyphenyl ester of 4-butylbenzoic acid
4'-butoxyphenyl ester of 4-butylbenzoic acid
4'-hexoxyphenyl ester of 4-butylbenzoic acid
4'-heptoxyphenyl ester of 4-butylbenzoic acid
4'-propylphenyl ester of 4-pentylbenzoic acid
4'-methoxyphenyl ester of 4-pentylbenzoic acid
4'-pentoxyphenyl ester of 4-pentylbenzoic acid
4'-ethylphenyl ester of 4-hexylbenzoic acid
4'-butylphenyl ester of 4-hexylbenzoic acid
4'-hexylphenyl ester of 4-hexylbenzoic acid
4'-heptylphenyl ester of 4-hexylbenzoic acid
4'-methoxyphenyl ester of 4-hexylbenzoic acid
4'-ethoxyphenyl ester of 4-hexylbenzoic acid
4'-butoxyphenyl ester of 4-hexylbenzoic acid
4'-hexoxyphenyl ester of 4-hexylbenzoic acid
4'-heptoxyphenyl ester of 4-hexylbenzoic acid
4-propylphenyl ester of anisic acid
4-pentylphenyl ester of anisic acid
4-hexylphenyl ester of anisic acid
4-heptylphenyl ester of anisic acid
4-butylphenyl ester of anisic acid
4-butoxyphenyl ester of anisic acid
4-hexoxyphenyl ester of anisic acid
4-heptoxyphenyl ester of anisic acid
4'-ethylphenyl ester of 4-ethoxybenzoic acid
4'-propylphenyl ester of 4-ethoxybenzoic acid
4'-pentylphenyl ester of 4-ethoxybenzoic acid
4'-ethoxyphenyl ester of 4-ethoxybenzoic acid
4'-hexoxyphenyl ester of 4-ethoxybenzoic acid
4'-propylphenyl ester of 4-propoxybenzoic acid
4'-butylphenyl ester of 4-propoxybenzoic acid
4'-pentoxyphenyl ester of 4-propoxybenzoic acid
4'-methylphenyl ester of 4-butoxybenzoic acid
4'-ethylphenyl ester of 4-butoxybenzoic acid
4'-butylphenyl ester of 4-butoxybenzoic acid
4'-pentylphenyl ester of 4-butoxybenzoic acid
4'-hexylphenyl ester of 4-butoxybenzoic acid
4'-heptylphenyl ester of 4-butoxybenzoic acid
4'-methoxyphenyl ester of 4-butoxybenzoic acid
4'-ethoxyphenyl ester of 4-butoxybenzoic acid
4'-butoxyphenyl ester of 4-butoxybenzoic acid
4'-hexoxyphenyl ester of 4-butoxybenzoic acid
4'-heptoxyphenyl ester of 4-butoxybenzoic acid
4'-ethylphenyl ester of 4-hexoxybenzoic acid
4'-propylphenyl ester of 4-hexoxybenzoic acid
4'-butylphenyl ester of 4-hexoxybenzoic acid
4'-pentylphenyl ester of 4-hexoxybenzoic acid
4'-hexylphenyl ester of 4-hexoxybenzoic acid
4'-heptylphenyl ester of 4-hexoxybenzoic acid
4'-methoxyphenyl ester of 4-hexoxybenzoic acid 4'-ethoxyphenyl ester of 4-hexoxybenzoic acid
4'-butoxyphenyl ester of 4-hexoxybenzoic acid
4'-hexoxyphenyl ester of 4-hexoxybenzoic acid
4'-heptoxyphenyl ester of 4-hexoxybenzoic acid
4'-ethylphenyl ester of 4-octoxybenzoic acid
4'-butylphenyl ester of 4-octoxybenzoic acid
4'-hexylphenyl ester of 4-octoxybenzoic acid
4'-ethoxyphenyl ester of 4-octoxybenzoic acid
4'-butoxyphenyl ester of 4-octoxybenzoic acid
4'-hexoxyphenyl ester of 4-octoxybenzoic acid
4'-heptoxyphenyl ester of 4-octoxybenzoic acid
4'-ethylphenyl ester of 4-octylbenzoic acid
4'-butylphenyl ester of 4-octylbenzoic acid
4'-hexylphenyl ester of 4-octylbenzoic acid
4'-butoxyphenyl ester of 4-octylbenzoic acid
4'-ethoxyphenyl ester of 4-octylbenzoic acid.

Especially preferred nematic mixtures of compounds of Formula 1 modified according to this invention by adding a compound of Formula 2 and optionally additionally a compound of Formula 3 are those made up of the following components:
4-n-butyl-4'-methoxy-azoxybenzene and
4-n-butyl-4'-n-butoxy-azoxybenzene;
4-n-butyl-4'-methoxy-azoxybenzene and
4-ethyl-4'-methoxy-azoxybenzene;
4-n-butyl-4'-methoxy-azoxybenzene and
4-n-butyl-4'-hexoxy-azoxybenzene;
4,4'-n-di-n-propyl-azoxybenzene and
4,4'-di-n-butyl-azoxybenzene;
4,4'-di-n-pentyl-azoxybenzene and
4,4'-di-n-hexyl-azoxybenzene;
4,4'-di-n-butyl-azoxybenzene and
4,4'-di-n-heptyl-azoxybenzene;
4,4'-di-n-butyl-azoxybenzene,
4,4'-di-n-pentyl-azoxybenzene, and
4,4'-di-n-hexyl-azoxybenzene;
4-n-butyl-4'-methoxy-azoxybenzene and
4,4'-di-n-butyl-azoxybenzene;
4-n-butyl-4'-methoxy-azoxybenzene,
4-ethyl-4'-methoxy-azoxybenzene, and
4,4'-di-n-hexyl-azoxybenzene;
4'-hexoxyphenyl ester of 4-hexoxybenzoic acid and
4'-hexoxyphenyl ester of 4-butoxybenzoic acid;
4'-hexoxyphenyl ester of 4-butylbenzoic acid and
4'-butylphenyl ester of 4-hexoxybenzoic acid;
4'-hexoxyphenyl ester of 4-hexoxybenzoic acid,
4'-hexoxyphenyl ester of 4-butoxybenzoic acid,
4-butylphenyl ester of anisic acid, and
4'-methoxyphenyl ester of 4-butylbenzoic acid;
4'-octoxyphenyl ester of 4-pentoxybenzoic acid and
4'-butoxyphenyl ester of 4-hexylbenzoic acid;
4'-butoxyphenyl ester of 4-hexylbenzoic acid and
4'-octoxyphenyl ester of 4-hexylbenzoic acid;
4-butoxyphenyl ester of anisic acid and
4'-pentoxyphenyl ester of 4-butoxybenzoic acid;
4-pentylphenyl ester of anisic acid and
4'-pentylphenyl ester of 4-hexoxybenzoic acid.

According to this invention, the nematic substances on the basis of compounds of Formula 1 are modified by adding at least one compound of Formula 2. The compounds of Formula 2 are either known from the literature or can be prepared in the same manner as analogous compounds set forth in the literature. Thus, for example, the 4-n-alkyl-benzonitriles are obtained from the corresponding 4-n-alkyl-anilines by diazotization and reaction with aqueous potassium tetracyanocuprate; the 4,4'-disubstituted benzoic acid phenyl esters are produced, for example, by reacting a 4-substituted benzoic acid halogenide with a 4-substituted alkali phenolate; 4'-nitro- or 4'-cyano-4-dialkylaminobiphenyls can be prepared by alkylation of 4'-cyano-or 4'-nitro-4-aminobiphenyl with a methyl and/or ethyl halogenide; 4-trifluoromethyl-n-alkyl-benzenes are obtained, for example, by reacting 4-n-alkybenzoic acids with sulfur tetrafluoride; 4'-dialkylamino-4-trifluoromethylbiphenyls are produced for example, by reacting 4'-nitrobiphenyl-4-carboxylic acid with sulfur tetrafluoride to obtain the 4'-nitro-4-trifluoromethylbiphenyl, the subsequent reduction thereof to the 4'-amino-4-trifluoromethylbiphenyl, and the following alkylation of this product with methyl and/or ethyl halogenides.

Examples for suitable compounds of Formula 2 are the following:
4-n-butylbenzonitrile
4-n-hexylbenzonitrile
4-n-octylbenzonitrile
4-dimethylaminobenzonitrile
4-diethylaminobenzonitrile
4-methylethylaminobenzonitrile
4-methylethylaminonitrobenzene
4-dimethylaminonitrobenzene
4-trifluoromethyl-n-hexylbenzene
N,N-diethyl-4-trifluoromethylaniline
N,N-dimethyl-4-trifluoromethylaniline
4-n-butyl-4'-cyanobiphenyl
4-n-heptyl-4'-cyanobiphenyl
4-dimethylamino-4'-cyanobiphenyl
4-diethylamino-4'-nitrobiphenyl
4-dimethylamino-4'-trifluoromethylbiphenyl
4-methylethylamino-4'-cyanobiphenyl
4'-dimethylaminophenyl ester of 4-cyanobenzoic acid
4'-cyanophenyl ester of 4-dimethylaminobenzoic acid
4'-cyanophenyl ester of 4-diethylaminobenzoic acid
4'-diethylaminophenyl ester of 4-cyanobenzoic acid
4'-methylethylaminophenyl ester of 4-cyanobenzoic acid
4'-n-butylphenyl ester of 4-cyanobenzoic acid
4'-n-pentylphenyl ester of 4-cyanobenzoic acid
4'-n-hexylphenyl ester of 4-cyanobenzoic acid
4'-n-heptylphenyl ester of 4-cyanobenzoic acid
4'-n-octylphenyl ester of 4-cyanobenzoic acid
4'-n-nonylphenyl ester of 4-cyanobenzoic acid
4'-cyanophenyl ester of 4-n-butylbenzoic acid
4'-cyanophenyl ester of 4-n-pentylbenzoic acid
4'-cyanophenyl ester of 4-n-hexylbenzoic acid
4'-cyanophenyl ester of 4-n-heptylbenzoic acid
4'-cyanophenyl ester of 4-n-octylbenzoic acid
4'-cyanophenyl ester of 4-n-nonylbenzoic acid
4'-dimethylaminophenyl ester of 4-nitrobenzoic acid
4'-dimethylaminophenyl ester of 4-trifluoromethylbenzoic acid
4'-diethylaminophenyl ester of 4-trifluoromethylbenzoic acid
4'-methylethylaminophenyl ester of 4-trifluoromethylbenzoic acid
4'-nitrophenyl ester of 4-dimethylaminobenzoic acid
4'-trifluoromethylphenyl ester of 4-dimethylaminobenzoic acid
4'-trifluoromethylphenyl ester of 4-diethylaminobenzoic acid
4'-cyanophenyl ester of 4-methylethylaminobenzoic acid 4'-trifluoromethylphenyl ester of 4-methylethylaminobenzoic acid.

Preferably, the compounds of Formula 2 wherein X is dimethylamino or, if R has the structure 2c or 2d, n-alkyl of 4–8 carbon atoms, and Y is CN are utilized for the modification of the nematic substances on the basis of compounds of Formula 1 according to the present invention. Especially preferred are the following:

4'-cyanophenyl ester of 4-dimethylaminobenzoic acid,
4'-dimethylainophenyl ester of 4-cyanobenzoic acid, and, in particular,
4-dimethylaminobenzonitrile,
4'-cyanophenyl ester of 4-n-butylbenzoic acid, and
4'-n-butylphenyl ester of 4-cyanobenzoic acid.

The quantitative ratio of the components of the modified nematic mixtures according to this invention is determined by the arithmetic sign and the magnitude of the dielectric anisotropy of the component(s) of Formula 1 to be modified, by the desired magnitude of the positive dielectric anisotropy and by the desired melting points and especially clearing points of the mixtures of this invention. Thus, it is occasionally sufficient in such compounds of Formula 1 or mixtures thereof which already possess a positive dielectric anisotropy, even though it be minor, to add about 1–3% by weight of the modifying compound of Formula 2 in order to obtain a mixture having useful positive dielectric anisotropy. In other cases where the basic material of Formula 1 has a marked negative dielectric anisotropy, a mixture of this invention produced therefrom can optionally contain 15–35% by weight of a compound of Formula 2. In principle, it is also possible to add still larger amounts of compounds of Formula 2; however, by adding such a large quantity of a compound which is not liquid-crystalline or which is only monotropically liquid-crystalline, the clearing point is normally lowered to such an extent that the thus-produced mixture, for this reason, has only limited technical applicability.

The clearing points of the nematic mixtures of this invention with positive dielectric anisotropy, consisting of at least respectively one compound of Formulae 1 and 2, normally are lower than the clearing points of the compounds or mixtures of compounds of Formula 1 utilized. In those cases where the clearing point is still at least 10° above room temperature, this usually has no adverse effect on the usefulness of the mixtures according to the invention. However, if a higher clearing point is desired, the clearing-point-lowering effect of the addition of compounds according to Formula 2 can be compensated by adding to the mixture additionally a compound of Formula 3. By this step, the clearing-point-lowering effect of the compounds of Formula 2 can be equalized to such an extent that mixtures of up to 65% by weight of compounds according to Formula 2 are technically usable as well.

The disubstituted benzoyloxybenzoic acid phenyl esters of Formula 3 are described in DOS 2,139,628 or can be produced analogously to the compounds of this structure disclosed therein. These compounds have a liquid-crystal character, high clearing points — normally above 150° C. — and are of a moderately high positive dielectric anisotropy. Examples for suitable additives to the nematic mixtures with positive dielectric anisotropy, modified in accordance with the present invention, are the following compounds of Formula 3:

4'-methoxyphenyl ester of 4-(4-ethylbenzoyloxy)-benzoic acid
4'-butoxyphenyl ester of 4-(4-ethylbenzoyloxy)-benzoic acid
4'-methylphenyl ester of 4-(4-butylbenzoyloxy)-benzoic acid
4'-butylphenyl ester of 4-(4-butylbenzoyloxy)-benzoic acid
4'-hexylphenyl ester of 4-(4-butylbenzoyloxy)-benzoic acid
4'-methoxyphenyl ester of 4-(4-butylbenzoyloxy)-benzoic acid
4'-butoxyphenyl ester of 4-(4-butylbenzoyloxy)-benzoic acid
4'-hexoxyphenyl ester of 4-(4-butylbenzoyloxy)-benzoic acid
4'-ethylphenyl ester of 4-(4-hexylbenzoyloxy)-benzoic acid
4'-butylphenyl ester of 4-(4-hexylbenzoyloxy)-benzoic acid
4'-hexylphenyl ester of 4-(4-hexylbenzoyloxy)-benzoic acid
4'-ethylphenyl ester of 4-(4-ethylbenzoyloxy)-benzoic acid
4'-butylphenyl ester of 4-(4-ethylbenzoyloxy)-benzoic acid
4'-ethylphenyl ester of 4-anisoyloxybenzoic acid
4'-propylphenyl ester of 4-anisoyloxybenzoic acid
4'-butylphenyl ester of 4-anisoyloxybenzoic acid
4'-heptylphenyl ester of 4-anisoyloxybenzoic acid
4'-ethoxyphenyl ester of 4-anisoyloxybenzoic acid
4'-ethylphenyl ester of 4-(4-ethoxybenzoyloxy)-benzoic acid
4'-butoxyphenyl ester of 4-(4-ethoxybenzoyloxy)-benzoic acid
4'-butylphenyl ester of 4-(4-butoxybenzoyloxy)-benzoic acid
4'-hexoxyphenyl ester of 4-(4-butoxybenzoyloxy)-benzoic acid
4'-methylphenyl ester of 4-(4-hexoxybenzoyloxy)-benzoic acid
4'-butylphenyl ester of 4-(4-hexoxybenzoyloxy)-benzoic acid
4'-methoxyphenyl ester of 4-(4-hexoxybenzoyloxy)-benzoic acid
4'-hexoxyphenyl ester of 4-(4-hexoxybenzoyloxy)-benzoic acid.

Preferred compounds of Formula 3 are those wherein at least one of the groups $R_1$ and $R_2$ is a straight-chain alkyl group, preferably of 4—8 carbon atoms, particularly n-butyl. Especially suitable compounds of Formula 3 have been found to be the following:

4'-n-butylphenyl ester of 4-anisoyloxybenzoic acid
4'-n-butylphenyl ester of 4-(4-n-hexoxybenzoyloxy)-benzoic acid
4'-n-butylphenyl ester of 4-(4-n-butyloyloxy)-benzoic acid.

The compounds of Formula 3 can be added to the modified nematic mixtures of this invention from compounds of Formulae 1 and 2 in order to raise the clearing point of these mixtures. The amount required for this purpose is primarily dependent on the magnitude of the clearing point of the mixture (1 + 2), as well as the desired level of the clearing point. If the clearing point is to be raised only a slight amount, it is normally sufficient to add a compound of Formula 3 in such a quantity which constitutes 3–10% by weight of the resultant mixture. For a larger shift in clearing point, it can, however, also be advantageous to produce mixtures with up to 27% by weight of one or more compounds according to Formula 3. In principle, even larger amounts of a compound of Formula 3 can be added, the upper limit being determined by the solubility of the compound of Formula 3 in the mixture of compounds of Formulae 1 and 2. However, in the usual case, no more than 10–25% by weight is employed because otherwise the viscosity of the mixtures increases to such an extent that the thus-produced liquid-crystal cells with homogeneous orientation show prolonged switching times.

The modified nematic mixtures of the present invention are used in a manner known per se as dielectrics in liquid-crystal cells with homogeneous orientation. Since they have a particularly steep characteristic (light permeability or impermeability as a function of the applied voltage), they are especially well suited for electronic indicating elements in multiplex operation, for example for matrix displays on the basis of twisted nematic cells. For this purpose, the mixtures of this invention are introduced in the usual manner, for example with an injection syringe, into the filling port(s) of suitable electrode arrangements. Suitable electrode arrangements consist normally of two transparent electrodes spaced apart at a distance of 8-25 microns, preferably 10-20 microns, which electrodes have been pretreated by rubbing with a polishing cloth or by treatment with an abrasive paste so that they enforce an at least predominantly homogeneous orientation on adjacent nematic substances. These electrodes, sealed liquid-tight at the edges, but electrically insulated, are joined for example by cementing so that they form a cell with at least one filling opening for a nematic liquid-crystal dielectric. After the cell has been filled with a nematic mixture of this invention, the filling opening(s) is (are) sealed, thus obtaining a liquid-crystal cell with homogeneous orientation. Such cells can be used for the production of electronic indicating elements, logic circuit elements, or optical shutters. If the electrodes are arranged so that the preferential direction of the molecules of the nematic substance in the direct vicinity of one electrode is rotated with respect to the direction in the immediate proximity of the other electrode by 90°, this represents a twisted nematic cell; in this special embodiment of the liquid-crystal cell with homogeneous orientation, the advantageous properties of the modified nematic mixtures according to the present invention are especially well exploited.

The following examples for nematic mixtures of this invention are to explain the invention without limiting same. All percentages indicated in the compositions are weight percent; after the composition, data are set forth regarding the dielectric anisotropy ($\Delta\epsilon$), the clearing point (c.p.), and, in part, the threshold voltage ($U_S$) when using the mixture in a twisted nematic cell with a layer thickness of 20 microns at 20° C. The melting points of all mixtures indicated in the examples are lower than 0° C.

Without further elaboration, it is believed that one skilled in the art can, using the preceding description, utilize the present invention to its fullest extent. The following preferred specific embodiments are, therefore, to be construed as merely illustrative, and no limitative of the remainder of the disclosure in any way whatsoever. In the following examples, all temperatures are set forth uncorrected in degrees Celsius; unless otherwise indicated, all parts and percentages are by weight.

EXAMPLE 1

94% 4-n-Butyl-4'-methoxy-azoxybenzene
6% 4-Dimethylaminobenzonitrile $\Delta\epsilon = +3.0$; c.p. 60° C.

EXAMPLE 2

92% 4-n-Butyl-4'-methoxy-azoxybenzene
8% 4-Dimethylaminobenzonitrile $\Delta\epsilon = +3.9$; c.p. 48° C.

EXAMPLE 3

90% 4-n-Butyl-4'-methoxy-azoxybenzene
10% 4-Dimethylaminobenzonitrile $\Delta\epsilon = +4.2$; c.p. 39° C.

EXAMPLE 4

88% 4-n-Butyl-4'-methoxy-azoxybenzene
12% 4-Dimethylaminobenzonitrile $\Delta\epsilon = +4.7$; c.p. 31° C.

EXAMPLE 5

44.5% 4-n-Pentylphenyl ester of anisic acid
22.2% 4'-n-Pentylphenyl ester of 4-n-hexoxybenzoic acid
22.2% 4'-Cyanophenyl ester of 4-n-butylbenzoic acid
11.1% 4'-n-Butylphenyl ester of 4-cyanobenzoic acid $\Delta\epsilon = +7.6$; c.p. 46° C.; $U_S = 1.3$ volts.

EXAMPLE 6

49.7% 4-n-Butyl-4'-methoxy-azoxybenzene
26.8% 4-Ethyl-4'-methoxy-azoxybenzene
13.5% 4-Dimethylaminobenzonitrile
10.0% 4'-n-Butylphenyl ester of 4-(4-n-butylbenzoyloxy)-benzoic acid $\Delta\epsilon = +4.9$; c.p. 34° C.

EXAMPLE 7

48.1% 4-n-Butyl-4'-methoxy-azoxybenzene
25.9% 4-Ethyl-4'-methoxy-azoxybenzene
13.0% 4-Dimethylaminobenzonitrile
13.0% 4'-n-Butylphenyl ester of 4-(4-n-butylbenzoyloxy)-benozic acid $\Delta\epsilon = +5.6$; c.p. 39° C.

EXAMPLE 8

46.9% 4-n-Butyl-4'-methoxy-azoxybenzene
25.3% 4-Ethyl-4'-methoxy-azoxybenzene
12.8% 4-Dimethylaminobenzonitrile
15.0% 4'-n-Butylphenyl ester of 4-(4-n-butylbenzoyloxy)-benzoic acid $\Delta\epsilon = +6.3$; c.p. 42.5° C.

EXAMPLE 9

44.2% 4-n-Butyl-4'-methoxy-azoxybenzene
23.8% 4-Ethyl-4'-methoxy-azoxybenzene
12.0% 4-Dimethylaminobenzonitrile 20.0% 4'-n-Butylphenyl ester of 4-(4-n-butylbenzoyloxy)-benzoic acid $\Delta\epsilon = +6.5$; c.p. 52° C.

EXAMPLE 10

44.2% 4-n-Butyl-4'-methoxy-azoxybenzene
23.8% 4-Ethyl-4'-methoxy-azoxybenzene
12.0% 4-Dimethylaminobenzonitrile
20.0% 4'-n-butylphenyl ester of 4-anisoyloxybenzoic acid $\Delta\epsilon = +7.2$; c.p. 58° C.

EXAMPLE 11

44.2% 4-n-Butyl-4'-methoxy-azoxybenzene
23.8% 4-Ethyl-4'-methoxy-azoxybenzene
12.0% 4-Dimethylaminobenzonitrile
10.0% 4'-n-Butylphenyl ester of 4-(4-n-butylbenzoyloxy)-benozic acid
10.0% 4'-n-Butylphenyl ester of 4-(4-n-hexoxybenzoyloxy)-benzoic acid $\Delta\epsilon = +7.1$; c.p. 65° C.

EXAMPLE 12

43.3% 4-n-Pentylphenyl ester of anisic acid
21.7% 4'-n-Pentylphenyl ester of 4-n-hexoxybenzoic acid
15.0% 4-Dimethylaminobenzonitrile
10.0% 4'-n-Butylphenyl ester of 4-(4-n-butylbenzoyloxy)-benzoic acid
10.0% 4'-n-Butylphenyl ester of 4-(4-n-hexoxybenzoyloxy)-benzoic acid $\Delta\epsilon = +6.8$; c.p. 41.5° C.; $U_S = 0.5$ v.

EXAMPLE 13

43.3% 4-n-Pentylphenyl ester of anisic acid
21.7% 4'-n-Pentylphenyl ester of 4-n-hexoxybenzoic acid 12.0% 4-Dimethylaminobenzonitrile
18.0% 4'-n-Butylphenyl ester of 4-(4-n-butylbenzoyloxy)-benozic acid
5.0% 4'-n-Butylphenyl ester of 4-(4-n-hexoxybenzoyloxy)-benzoic acid $\Delta\epsilon = +6.3$; c.p. 47.5° C.; $U_S = 1.1$ v.

EXAMPLE 14

40.0% 4-n-Pentylphenyl ester of anisic acid
20.0% 4-n-Pentylphenyl ester of 4-n-hexoxybenzoic acid
20.0% 4'-Cyanophenyl ester of 4-n-butylbenzoic acid
10.0% 4'n-Butylphenyl ester of 4-cyanobenzoic acid
10.0% 4'-n-Butylphenyl ester of 4-(4-n-butylbenzoyloxy)-benzoic acid $\Delta\epsilon = +7.4$; c.p. 56.5° C.; $U_S = 1.45$ v.

EXAMPLE 15

40.0% 4-n-Pentylphenyl ester of anisic acid
20.0% 4-n-Pentylphenyl ester of 4-n-hexoxybenzoic acid 10.0% 4'-Cyanophenyl ester of 4-n-butylbenzoic acid
10.0% 4'-n-Butylphenyl ester of 4-cyanobenzoic acid
10.0% 4'-n-Butylphenyl ester of 4-(4-n-hexoxybenzoyloxy)-benzoic acid $\Delta\epsilon = +7.2$; c.p. 60.5° C.; $U_S = 1.4$ v.

EXAMPLE 16

35.0% 4-n-Pentylphenyl ester of anisic acid
17.5% 4'-n-Pentylphenyl ester of 4-n-hexoxybenzoic acid
18.3% 4'-Cyanophenyl ester of 4-n-butylbenzoic acid
9.2% 4'-n-Butylphenyl ester of 4-cyanobenzoic acid
10.0% 4'-n-Butylphenyl ester of 4-(4-n-butylbenzoyloxy)-benzoic acid
10.0% 4-Dimethylaminobenzonitrile $\Delta\epsilon = +8.8$; c.p. 33.5° C.; $U_S = 0.8$ v.

EXAMPLE 17

31.1% 4-n-Pentylphenyl ester of anisic acid
15.6% 4'-n-Pentylphenyl ester of 4-n-hexoxybenzoic acid
15.5% 4'-Cyanophenyl ester of 4-n-butylbenzoic acid
7.8% 4'-n-Butylphenyl ester of 4-cyanobenzoic acid
20.0% 4'-n-Butylphenyl ester of 4-(4-n-butylbenzoyloxy)-benzoic acid
10.0% 4-Dimethylaminobenzonitrile $\Delta\epsilon = +10.3$; c.p. 43.5° C.; $U_S = 1.2$ v.

EXAMPLE 18

15.5% 4-n-Pentylphenyl ester of anisic acid
7.8% 4'-n-Pentylphenyl ester of 4-n-hexoxybenzoic acid
31.1% 4'-Cyanophenyl ester of 4-n-butylbenzoic acid
15.6% 4'-n-Butylphenyl ester of 4-cyanobenzoic acid
20.0% 4'-n-Butylphenyl ester of 4-(4-n-butylbenzoyloxy)-benzoic acid
10.0% 4-Dimethylaminobenzonitrile $\Delta\epsilon = +14.1$; c.p. 41° C.; $U_S = 0.7$ v.

EXAMPLE 19

35.6% 4-n-Pentylphenyl ester of anisic acid
17.8% 4'-n-Pentylphenyl ester of 4-n-hexoxybenzoic acid
13.3% 4'-Cyanophenyl ester of 4-n-butylbenzoic acid
13.3% 4'-n-Butylphenyl ester of 4-cyanobenzoic acid
15.0% 4'-n-Butylphenyl ester of 4-(4-n-butylbenzoyloxy)-benzoic acid
5.0% 4-Dimethylaminobenzonitrile $\Delta\epsilon = +8.1$; c.p. 50° C.; $U_S = 1.3$ v.

EXAMPLE 20

17.8% 4-n-Pentylphenyl ester of anisic acid
8.9% 4'-n-Pentylphenyl ester of 4-n-hexoxybenzoic acid
42.7% 4'-Cyanophenyl ester of 4-n-butylbenzoic acid
10.6% 4'-n-Butylphenyl ester of 4-cyanobenzoic acid
10.0% 4'-n-Butylphenyl ester of 4-(4-n-butylbenzoyloxy)-benzoic acid
10.0% 4-Dimethylaminobenzonitrile $\Delta\epsilon = +12.2$; c.p. 32.5° C.; $U_S = 0.6$ v.

EXAMPLE 21

31.1% 4-n-Pentylphenyl ester of anisic acid
15.6% 4'-n-Pentylphenyl ester of 4-n-hexoxybenzoic acid
15.5% 4'-Cyanophenyl ester of 4-n-butylbenzoic acid
7.8% 4'-n-Butylphenyl ester of 4-cyanobenzoic acid
10.0% 4'-n-Butylphenyl ester of 4-(4-n-butylbenzoyloxy)-benzoic acid
10.0% 4-Dimethylaminobenzonitrile
10.0% 4'-Cyanophenyl ester of 4-dimethylaminobenzoic acid $\Delta\epsilon = + 14.9$; c.p. 36.5° C.; $U_S = 0.65$ v.

EXAMPLE 22

33.8% 4-n-Pentylphenyl ester of anisic acid
16.8% 4'-n-Pentylphenyl ester of 4-n-hexoxybenzoic acid
16.9% 4'-Cyanophenyl ester of 4-n-butylbenzoic acid
8.5% 4'-n-Butylphenyl ester of 4-cyanobenzoic acid
20.0% 4'-n-Butylphenyl ester of 4-(4-hexoxybenzoyloxy)-benzoic acid
4.0% 4-Dimethylaminobenzonitrile $\Delta\epsilon = + 7.3$; c.p. 66.5° C.; $U_S = 1.1$ v.

EXAMPLE 23

43.3% 4-n-Pentylphenyl ester of anisic acid
21.7% 4'-n-Pentylphenyl ester of 4-n-hexoxybenzoic acid
15.0% 4-Dimethylaminobenzonitrile
5.0% 4'-n-Butylphenyl ester of 4-(4-n-butylbenzoyloxy)-benzoic acid
15.0% 4'-n-Butylphenyl ester of 4-(4-n-hexoxybenzoyloxy)-benzoic acid $\Delta\epsilon = + 6.0$; c.p. 42° C.; $U_S = 0.8$ v.

EXAMPLE 24

43.3% 4-n-Pentylphenyl ester of anisic acid
21.7% 4'-n-Pentylphenyl ester of 4-n-hexoxybenzoic acid
15.0% 4-Dimethylaminobenzonitrile
15.0% 4'-n-Butylphenyl ester of 4-(4-n-butylbenzoyloxy)-benzoic acid
5.0% 4'-n-Butylphenyl ester of 4-(4-n-hexoxybenzoyloxy)-benzoic acid $\Delta\epsilon = + 4.5$; c.p. 36° C.; $U_S = 0.7$ v.

EXAMPLE 25

43.5% 4-n-Butyl-4'-methoxy-azoxybenzene
23.5% 4-Ethyl-4'-methoxy-azoxybenzene
13.0% 4-Dimethylaminobenzonitrile
20.0% 4'-n-Butylphenyl ester of 4-anisoyloxybenzoic acid $\Delta\epsilon = + 6.6$; c.p. 65° C.

EXAMPLE 26

43.5% 4-n-Butyl-4'-methoxy-azoxybenzene
23.5% 4-Ethyl-4'-methoxy-azoxybenzene
13.0% 4-Dimethylaminobenzonitrile
20.0% 4'-n-Butylphenyl ester of 4-(4-n-butylbenzoyloxy)-benzoic acid $\Delta\epsilon = + 5.6$; c.p. 56.5° C.

EXAMPLE 27

40.3% 4-n-Butyl-4'-methoxy-azoxybenzene
21.7% 4-Ethyl-4'-methoxy-azoxybenzene
20.0% 4-Dimethylaminobenzonitrile
18.0% 4'-n-Butylphenyl ester of 4-(4-n-butylbenzoyloxy)-benzoic acid $\Delta\epsilon = + 5.7$; c.p. 31.5° C.

EXAMPLE 28

37.6% 4-n-Butyl-4'-methoxy-azoxybenzene
20.2% 4-Ethyl-4'-methoxy-azoxybenzene
10.2% 4-Dimethylaminobenzonitrile
10.0% 4'-Cyanophenyl ester of 4-n-butylbenzoic acid
5.0% 4'-n-Butylphenyl ester of 4-cyanobenzoic acid
8.5% 4'-n-Butylphenyl ester of 4-(4-n-butylbenzoyloxy)-benzoic acid
8.5% 4'-n-Butylphenyl ester of 4-(4-n-hexoxybenzoyloxy)-benzoic acid $\Delta\epsilon = + 10.1$; c.p. 54.5° C.; $U_S = 1.1$ v.

EXAMPLE 29

39.8% 4-n-Butyl-4'-methoxy-azoxybenzene
21.4% 4-Ethyl-4'-methoxy-azoxybenzene
10.8% 4-Dimethylaminobenzonitrile
6.7% 4'-Cyanophenyl ester of 4-n-butylbenzoic acid
3.3% 4'-n-Butylphenyl ester of 4-cyanobenzoic acid
9.0% 4'-n-Butylphenyl ester of 4-(4-n-butylbenzoyloxy)-benzoic acid
9.0% 4'-n-Butylphenyl ester of 4-(4-n-hexoxybenzoyloxy)-benzoic acid $\Delta\epsilon = + 8.7$; c.p. 55.5° C.; $U_S = 1.0$ v.

EXAMPLE 30

35.4% 4-n-Butyl-4'-methoxy-azoxybenzene
19.0% 4-Ethyl-4'-methoxy-azoxybenzene
9.6% 4-Dimethylaminobenzonitrile
6.7% 4'-Cyanophenyl ester of 4-n-butylbenzoic acid
3.3% 4'-n-Butylphenyl ester of 4-cyanobenzoic acid
18.0% 4'-n-Butylphenyl ester of 4-(4-n-butylbenzoyloxy)-benzoic acid
8.0% 4'-n-Butylphenyl ester of 4-(4-n-hexoxybenzoyloxy)-benzoic acid $\Delta\epsilon = + 7.8$; c.p. 62° C.; $U_S = 1.2$ v.

The following example explains the use of the modified nematic mixtures of the present invention as dielectrics in liquid-crystal cells with homogeneous orientation:

EXAMPLE 31

Two glass plates are provided having a thickness of 1 mm. and an area of 110 × 100 mm., both coated on one side in the longitudinal direction with a strip pattern of thin dioxide having a thickness of 0.15 micron (this pattern consists of strips having a width of 2 mm. arranged at mutual spacings of 0.5 mm.; each strip is connected to an electric lead at the upper end). These plates are rubbed with a soft cotton cloth on the coated side, from the electric leads in the direction of the strips.

A plate pretreated in this way is then placed on a support with the coated and rubbed side facing upwardly. A mask having the (external) dimensions of 100 × 100 mm., made up of polyethylene strips having a thickness of 20 microns and a width of 2 mm. is placed on the plate so that the edge with the electric leads remains vacant. Thereafter, the second glass plate is placed, with the coated side facing downwardly, on the first plate with the mask, so that the strips extend vertically to the strips provided on the first plate. The plates, with the interposed mask, are glued together, leaving respectively one filling aperture on two opposite sides for the liquid-crystal dielectric. The outer sides of the plates are coated with a polarizing film, the direction of polarization of which is in each case parallel to the strips on the respective plate; thus, the polarizing directions are vertical to each other. After the adhesive has cured, the arrangement is filled, with the aid of an injection syringe, with about 0.2 ml. of a nematic mixture according to one of the preceding examples. The thus-obtained matrix display on the basis of the twisted nematic cell is transparent as long as not voltage has been applied. By applying voltages of about 3 volts to individual leads of the two plates, the intersecting points of the associated strips become dark in direct view.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A modified liquid crystal nematic mixture having positive dielectric anisotropy and an enantiotropic nematic mesophase of about 20° to 80° C. extending over temperatures from 0° to 30° C., comprising an admixture of:

a. at least one nematic compound of the formula

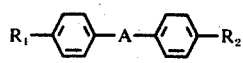

wherein A is azoxy or carbonyloxy and $R_1$ and $R_2$ are each straight-chain alkyl or alkoxy of 1–8 carbon atoms; and
   b. at least one compound of the formula

wherein X is dialkylamino of 2–4 carbon atoms; Y is cyano, nitro or trifluoromethyl; and R is selected from the group consisting of divalent radicals of the formulae

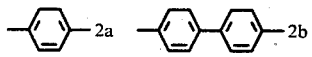

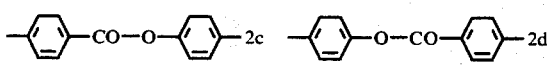

characterized in that component (b) is present in an amount sufficient to increase the dielectric anisotropy of the admixture to a value of at least +2.

2. A modified nematic mixture according to claim 1, comprising 65–99% by weight of (a) and correspondingly 35–1% by weight of (b).

3. A modified nematic mixture according to claim 2, comprising 70–95% by weight of (a) and correspondingly 30–5% by weight of (b).

4. A modified nematic mixture according to claim 1, wherein R has the structure 2c or 2d and Y is cyano.

5. A modified nematic mixture according to claim 1, wherein R has the structure 2a or 2b and Y is cyano.

6. A modified nematic mixture according to claim 5, wherein X is dimethylamino.

7. A modified nematic mixture according to claim 1, wherein component (b) is 4-dimethylaminobenzonitrile.

8. A modified nematic mixture according to claim 1, wherein component (a) is one in which at least one of $R_1$ and $R_2$ is straight-chain alkyl.

9. A modified nematic mixture according to claim 8, wherein component (a) is selected from the group consisting of 4-n-buty-4'-methoxy-azoxybenzene, 4-ethyl-4'-methoxyazoxybenzene and mixtures thereof.

10. A modified nematic mixture according to claim 8, wherein component (a) is selected from the group consisting of the 4-n-pentylphenyl ester of anisic acid, the 4'-pentylphenyl ester of 4-n-hexoxybenzoic acid and mixtures thereof.

11. A modified liquid crystal nematic mixture having positive dielectric anisotropy and an enantiotropic nematic mesophase of about 20° to 80° C. extending over temperatures from 0° to 30° C., comprising an admixture of:

a. 20–95% by weight of at least one nematic compound of the formula

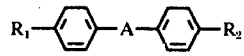

wherein A is azoxy or carbonyloxy and $R_1$ and $R_2$ are each straight-chain alkyl or alkoxy of 1–8 carbon atoms;
   b. 3–65% by weight of at least one compound of the formula X — R — Y wherein X is straight-chain alkyl of 4–9 carbon atoms or dialkylamino of 2–4 carbon atoms; Y is cyano, nitro or trifluoromethyl when X is dialkylamino, and Y is nitro or trifluoromethyl when X is straight-chain alkyl; and R is selected from the group consisting of divalent radicals of the formulae

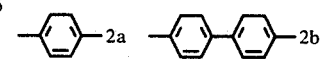

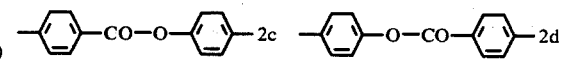

characterized in that component (b) is present in an amount sufficient to increase the dielectric anisotropy of the admixture to a value of at least +2; and
   c. 2–27% by weight based on the total composition of at least one compound of the formula

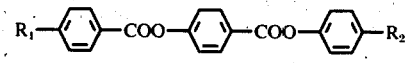

wherein $R_1$ and $R_2$ are each alkyl or alkoxy of 1–8 carbon atoms, said component (c) being present in an amount sufficient to compensate the clearing-point-lowering effect of the addition of component (b) to the nematic component (a).

12. A modified nematic mixture according to claim 11 comprising 45–80% by weight of (a); 10–45% by weight of (b); and 10–25% by weight of (c).

13. A modified nematic mixture according to claim 11, wherein at least one of $R_1$ and $R_2$ of component (c) is straight-chain alkyl of 4–8 carbon atoms.

14. A modified nematic mixture according to claim 13, wherein component (c) is selected from the group consisting of the 4'-n-butylphenyl ester of 4-anisoyloxybenzoic acid, the 4'-n-butylphenyl ester of 4-(4-n-hexoxybenzoyloxy)-benzoic acid, the 4'-n-butylphenyl ester of 4-(4-n-butylbenzoyloxy)benzoic acid and mixtures thereof.

15. In a liquid crystal electrooptical cell comprising transparent or translucent electrodes surrounding a dielectric nematic composition having a homogeneous orientation, the improvement wherein said nematic composition is the modified nematic mixture of claim 1.

16. In a liquid crystal electrooptical cell comprising transparent or translucent electrodes surrounding a dielectric nematic composition having a homogenous orientation, the improvement wherein said nematic composition is the modified nematic mixture of claim 11.

17. A process for increasing the dielectric anistropy of a nematic substance consisting of at least one compound of the formula

wherein A is azoxy or carbonyloxy and $R_1$ and $R_2$ are each straight-chain alkyl or alkoxy of 1–8 carbon atoms, which comprises admixing therewith at least one compound of the formula

wherein X is dialkylamino of 2–4 carbon atoms; Y is cyano, nitro or trifluoromethyl; and R is selected from the group consisting of divalent radicals of the formulae

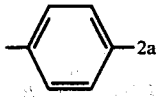 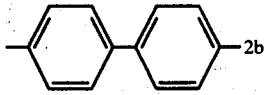

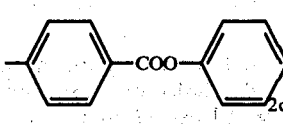 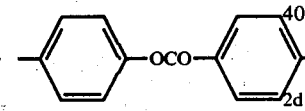

in an amount sufficient to increase the dielectric anisotropy to a value of at least +2.

18. A process according to claim 17, further comprising admixing at least one compound of the formula

wherein $R_1$ and $R_2$ are each alkyl or alkoxy of 1–8 carbon atoms, in an amount sufficient to compensate the clearing-point-lowering effect of the admixture of the compound of the formula

19. A modified nematic mixture according to claim 5, comprising 20–95% by weight of (a); 3–65% by weight of (b); and (c) 2–27% by weight based on the total composition of at least one compound of the formula

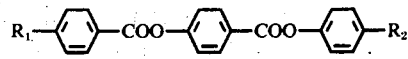

wherein $R_1$ and $R_2$ are each alkyl or alkoxy of 1–8 carbon atoms, said component (c) being present in an amount sufficient to compensate the clearing-point-lowering effect of the addition of component (b) to the nematic component (a).

20. A modified nematic mixture according to claim 19, comprising 45–80% by weight of (a); 10–45% by weight of (b); and 10–25% by weight of (c).

21. A modified nematic mixture according to claim 19, wherein at least one of $R_1$ and $R_2$ of component (c) is straight-chain alkyl of 4–8 carbon atoms.

22. A modified nematic mixture according to claim 19, wherein component (c) is selected from the group consisting of the 4'-n-butylphenyl ester of 4-anisoyloxybenzoic acid, the 4'-n-butylphenyl ester of 4-(4-n-hexoxybenzoyloxy)-benzoic acid, the 4'-n-butylphenyl ester of 4-(4-n-butylbenzoyloxy)-benzoic acid and mixtures thereof.

23. A modified nematic mixture according to claim 19, wherein X in component (b) is dimethylamino.

24. A modified nematic mixture according to claim 19, wherein component (a) is selected from the group consisting of 4-n-butyl-4'-methoxy-azoxybenzene, 4-ethyl-4'-methoxy-azoxybenzene and mixtures thereof.

25. A modified nematic mixture according to claim 24, wherein X in component (b) is dimethylamino.

26. A modified nematic mixture according to claim 25, wherein component (b) is 4-dimethylaminobenzonitrile.

27. A modified nematic mixture according to claim 25, wherein component (c) is selected from the group consisting of the 4'-n-butylphenyl ester of 4-anisoyloxybenzoic acid, the 4'-n-butylphenyl ester of 4-(4-n-hexoxybenzoyloxy)benzoic acid, the 4'-n-butylphenyl ester of 4-(4-n-butylbenzoyloxy)benzoic acid and mixtures thereof.

28. A modified nematic mixture according to claim 24, wherein component (a) is a mixture of said compounds containing a major portion of said 4-n-butyl-4'-methoxyazoxybenzene.

29. A modified nematic mixture according to claim 28, wherein X in component (b) is dimethylamino.

30. A modified nematic mixture according to claim 29, wherein component (b) is 4-dimethylaminobenzonitrile.

31. A modified nematic mixture according to claim 29, wherein component (c) is selected from the group consisting of the 4'-n-butylphenyl ester of 4-anisoyloxybenzoic acid, the 4'-n-butylphenyl ester of 4-(4-n-hexoxybenzoyloxy)benzoic acid, the 4'-n-butylphenyl ester of 4-(4-n-butylbenzoyloxy)benzoic acid and mixtures thereof.

32. A modified nematic mixture according to claim 30, wherein component (c) is the 4'-n-butylphenyl ester of 4-(4-n-butylbenzoyloxy)-benzoic acid.

33. A modified nematic mixture according to claim 30, wherein component (c) is a mixture of the 4'-n-butylphenyl ester of 4-(4-n-butylbenzoyloxy)-benzoic acid and the 4'-n-butylphenyl ester of 4-(4-n-hexoxybenzoyloxy)-benzoic acid.

* * * * *